March 10, 1953 G. P. CASTNER Re. 23,626

WASHING MACHINE HAVING ROTATABLE TUB
WITH UPPER AND LOWER DISCHARGE MEANS

Original Filed Dec. 21, 1945 2 SHEETS—SHEET 1

Inventor
GEORGE P. CASTNER

By Carlson & Hafle
Attorney

March 10, 1953 G. P. CASTNER Re. 23,626

WASHING MACHINE HAVING ROTATABLE TUB WITH UPPER AND LOWER DISCHARGE MEANS

Original Filed Dec. 21, 1945 2 SHEETS—SHEET 2

Inventor
GEORGE P. CASTNER

By Carlsen & Hazle
Attorneys

Reissued Mar. 10, 1953 Re. 23,626

UNITED STATES PATENT OFFICE 23,626

WASHING MACHINE HAVING ROTATABLE TUB WITH UPPER AND LOWER DISCHARGE MEANS

George P. Castner, Webster City, Iowa, assignor to Solar Corporation, Milwaukee, Wis., a corporation of Delaware Original No. 2,470,140, dated May 17, 1949, Serial No. 636,304, December 21, 1945. Application for reissue December 8, 1952, Serial No. 324,862

8 Claims. (Cl. 68—23)

Matter enclosed in heavy brackets [ ] appears in the original patent but forms no part of this reissue specification; matter printed in italics indicates the additions made by reissue.

This invention relates generally to improvements in washing machines and more particularly to improvements in means for disposal of the wash and rinse water or liquid and accumulated sedimentary material or dirt from such machines.

The invention particularly aims to improve that type of machine, ordinarily used domestically, wherein the clothes are washed and rinsed by an agitating action of any kind and are then dried centrifugally, leaving the clothes in a so-called damp-dry condition. For the centrifugal extraction of the washing and rinsing water, or liquid, from the clothes it is customary to employ a perforated basket or container for the clothes, through the perforations of which container the liquid can escape as the container is spun. It is, of course, necessary in such case to operate the perforated container within an outer tub so that the water or liquid will be confined, but in this case there is a waste of water since the water surrounding the container within the tub is of no benefit to either washing or rinsing operations. The volume of water thus wasted is considerable, since the waste zone extends entirely around the container.

In accordance with my invention, and as an important object thereof, I provide a machine having an imperforate tub used to hold both the clothes and the entire volume of wash or rinse water or liquid so that a materially smaller quantity of water is required for a given amount of clothes. The same tub is also used as an extractor, being spun to eject the water by centrifugal force upwardly and outwardly from the tub, so that the clothes may be also dried without use of a perforated tub or liner for the purpose.

The use of an imperforate tub for this purpose, however, brings up the problem of the disposal of the sedimentary deposit which accumulates as washing operations proceed. This sediment, composed of sand, extracted dirt and such heavy foreign particles, ordinarily escapes through the perforations in a perforated tub during the washing operation or as it is spun during extraction, but in the imperforate tub must be drained off or disposed of in some other fashion since it obviously will not work up through the clothes, and be expelled with the water, in this type of construction. The use of a drain valve, and accommodating its opening and closing operations to the spinning action of the tub introduces mechanical and operational difficulties so great as to make it impractical, and such a valve as well is quite expensive to manufacture.

A further and important object of my present invention, therefore, resides in the provision of practical, simple and efficacious means for disposal of the sediment from an imperforate tub as used for both washing and centrifugal extraction, and in which the positive and complete disposal of accumulated sedimentary deposits occurs as a concomitant of the spinning during extraction, without attention on the part of the operator.

Still another object is to provide a machine of this nature having means for effectively disposing of the scum or suds which accumulates on the surface of the water during the washing operation, and thus preventing this material from settling upon and sifting through the clothes as the water is extracted, as ordinarily happens.

The foregoing and other more detailed objects and advantages of my invention will be disclosed in the course of the following specification, reference in which is made to the accompanying drawing, wherein.

Figure 4:
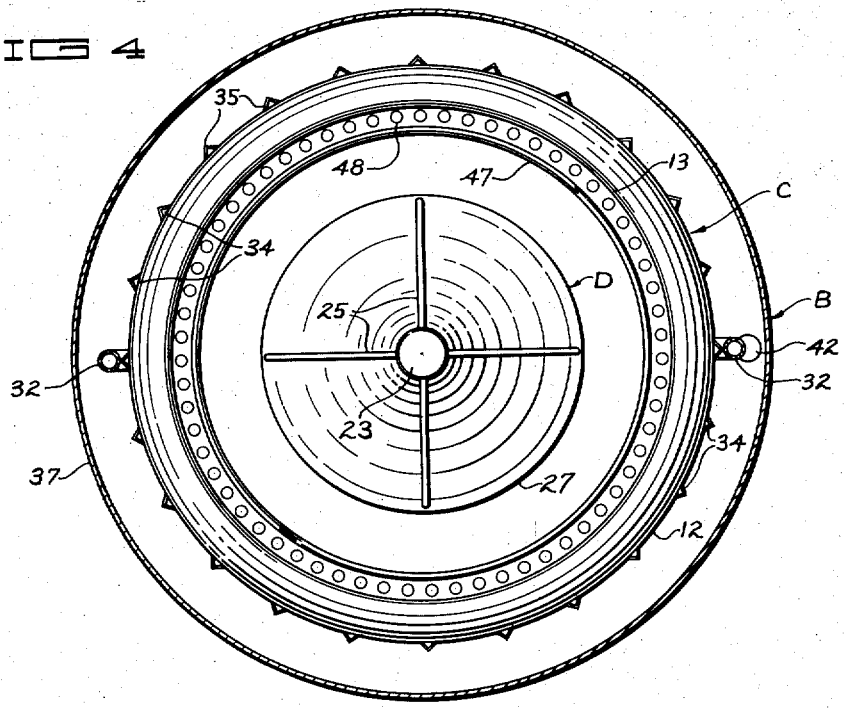
Fig. 4 is a horizontal sectional view of the machine along the line 4—4 in Fig. 1.

Referring now more particularly and by reference characters to the drawing, A designates a base frame upon which the washer proper, comprising an outer casing or stationary tub B, an inner rotatable or washing and spinning tub C, and agitator D, are mounted and supported. The base frame A includes a top member or spider 10 upon which the tub B, or casing as it will be hereinafter called, is supported, and further has an upright, centrally located bearing 11 through which is journaled and supported means for spinning the tub C and operating the agitator D. The base frame may further as usual support a motor or engine and transmission, none of which are shown, by which these parts are operated.

The tub C has a generally cylindrical wall 12 formed at the top with an opening 13 to receive the clothes and water. The bottom 14 of this tub is somewhat bowl-shaped and slopes inwardly and is fastened, as by screws 15, to an annular upstanding rim 16 upon a base plate or bottom member 17. This base plate 17 has an upwardly cupped center portion 18 which is in turn formed with a reduced tubular upward extension 19, and said center of the base plate is secured by cap screws 20 to the enlarged upper end 21 of a tubular shaft 22 or sleeve journaled through anti-friction bearings suitably located in the bearing 11. The shaft 22 and the tub may be rotated at high speed, when required, by the motor or operating mechanism in the bottom of the machine.

The agitator D has a tubular center portion 23 which is placed over the extension 19 of the tub base and the agitator is attached to and supported on a shaft 24. This shaft 24 depends through the tubular tub drive shaft 22 and may be oscillated or otherwise operated to cause wings or fins 25 upon the agitator to agitate and wash the clothes placed in the tub, in the usual manner. It will be noted that the lower skirt portion of the agitator's hollow center portion 23 is belled or flared out in a downward direction, as designated at 26, and that the outer lower rim 27 thus formed upon the agitator stands some distance above the center portion of the tub bottom.

The upstanding rim 16 of the bottom plate 17 of the tub forms a shallow, annular sediment trap 28 at the bottom, center of the tub. Sedimentary material will be guided into this trap 28 by the inwardly and downwardly sloping bottom 14 of the tub and to facilitate the flow of such material into the trap I provide, in the construction here shown, a rim member 29 which is secured around the inner margin of the tub bottom where it is fastened to the aforesaid rim 16, and which is held in place by the screws 15. As clearly shown this rim member 29 extends inwardly as at 30 beyond the rim 16 and thus overhangs the outer marginal portion of the sediment trap. It should here also be noted that while the rim 27 of agitator skirt 26 is spaced above the rim 29, to permit the movement of sediment into the trap 28, the rim of the skirt extends radially outwardly beyond the inner edge of the rim 29 to thereby effectively cover the trap and prevent articles being washed from moving down into the trap. Such moving is further prevented by the fact that the agitator is of the oscillating type wherein the vanes 25 produce a toroidal current which sweeps the articles outwardly over the rim 27 and thence upwardly in a general direction away from the trap, while the heavier sedimentary material finds its way inwardly down over the rim 29 to the trap.

*Inasmuch as the sediment trap 28 is annular in form and extends entirely around the base plate, under and concentric with the agitator skirt, it will be seen that all areas of the dished bottom part 14 of the tub will drain freely and directly into the trap.*

One or more openings or outlets 31 are formed radially outward through the rim 16 and are here shown as two in number located at diametrically opposite points, and communicating with the sediment trap 28, and disposal tubes 32 are secured at one end in said outlets. These tubes extend first outwardly and then upwardly from the outlets 31 and pass up along opposite sides of the tub, to which sides the tubes are secured in any suitable manner. The tubes terminate at their open upper ends 33 some distance below the top of the tub and, as will be noted in Fig. 1, the tubes also incline outward toward their upper ends.

Figure 1:
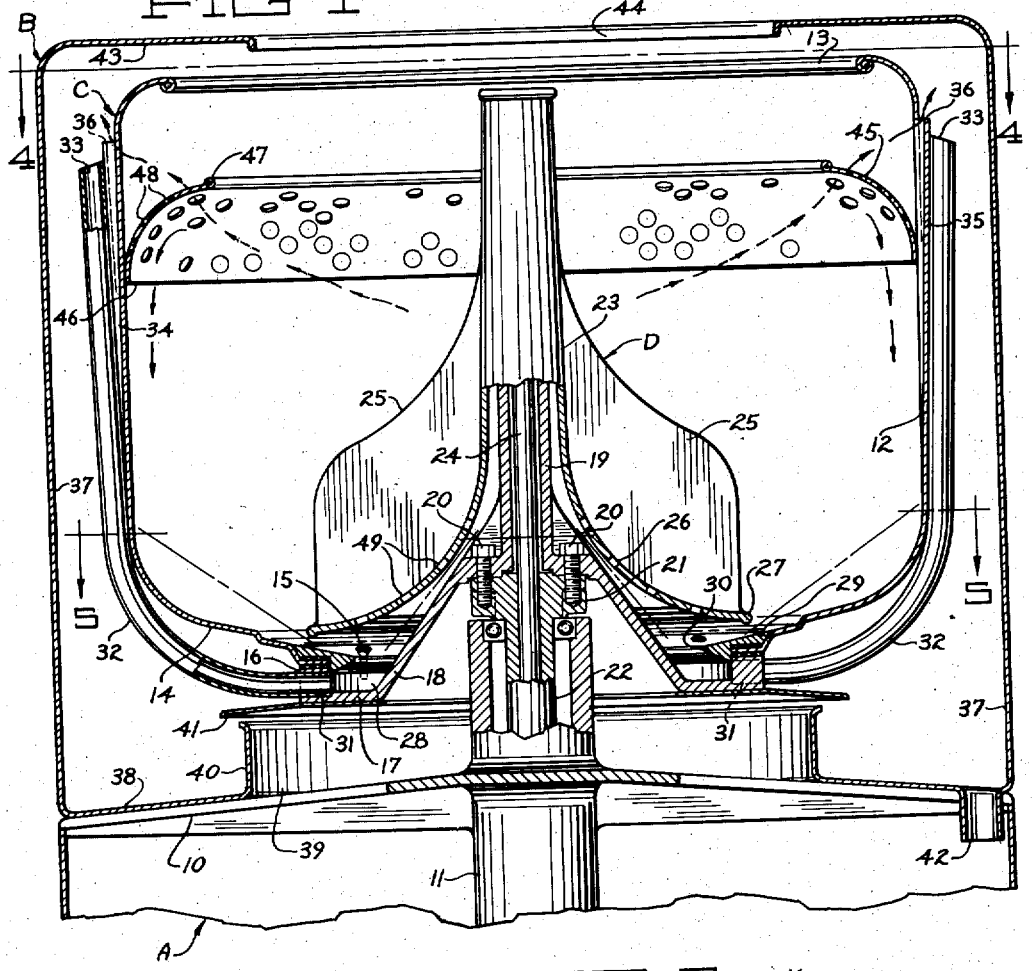
Fig. 1 is a vertical, diametrical sectional view through the upper portion of a washing machine embodying my invention.

The tub wall 12 is provided with upwardly extending, inwardly opening grooves or channels 34 and as here shown these are formed by upwardly flaring outwardly pressed flutes or corrugations 35. The channels 34 open at upper ends 36 outwardly from the tub, below its upper edge and two of the flaring flutes serve as convenient anchorages for the tubes 32 as seen in Fig. 1. Also as clearly shown therein the upper ends of the tubes 32 fall below the upper ends 36 of the channels.

The casing B may be either square or round, or any other desired shape, in plan, and has upstanding walls 37, and a bottom 38 which rests upon the frame A. The bottom 38 has a large central opening 39 allowing access from beneath to the tub bottom and adjacent parts, and this opening is defined by an upstanding neck 40 which terminates some distance below the tub. An annular splash shield 41 is secured to the underside of the base plate 17 and overhangs the neck 40 to prevent water from entering opening 39. The casing bottom 38 slopes outwardly from the neck 40 to the walls 37 and adjacent one wall there is provided a drain 42.

The casing further has a top 43 provided with an opening 44 for an obvious purpose, and it will be evident that the casing may not only serve as means for collecting water extracted from the clothes, but may be neatly shaped and finished to act as the exterior trim for the upper part of the machine.

In the operation of the machine as thus far described, it will be apparent the clothes and washing liquid or water may be placed in the tub C and washed by operation of the agitator D in the usual fashion. All of the liquid is contained within the tub and there is no waste or inactive liquid as there is where a perforated container or liner is used, within an outer stationary tub. When the washing is completed the tub C is spun rapidly and the centrifugal action then extracts the water from the clothes leaving them in what may be called a damp-dry condition. In this process the water swirls outwardly and upwardly and emerges from the open upper ends of the channels 34, while the clothes are pressed outwardly and downwardly along the lower and outer interior of the tub. The same action occurs as the clothes are rinsed and the rinsing liquid extracted. As the water leaves the tub C it, of course, accumulates on the bottom of the casing B from whence it is disposed of through the drain 42.

During the washing operation the heavy sedimentary material which is removed from the clothes naturally settles to the bottom of the tub and due to the slope thereof, works its way down over the rim member 29, under the skirt 26, and into the sediment trap 28 as above set forth. As the tub C is then spun to extract the water, this trapped sediment and the water up to the level of the top of the sediment trap, is prevented from whirling upwardly and outwardly with the rest of the liquid from the tub by the inwardly projecting overhanging rim 29. Instead, this trapped sediment and water is caused, by centrifugal force, to escape through the outlets 31 and to be forcibly ejected upwardly and outwardly through the tubes 32 into the casing B and to be disposed of along with the extracted water through the drain 42. Thus it will be seen that the sediment is disposed of as effectively as with the perforated spinning container, without use of a complicated or troublesome drain valve in the tub C, and without any attention on the part of the operator.

Figure 5:
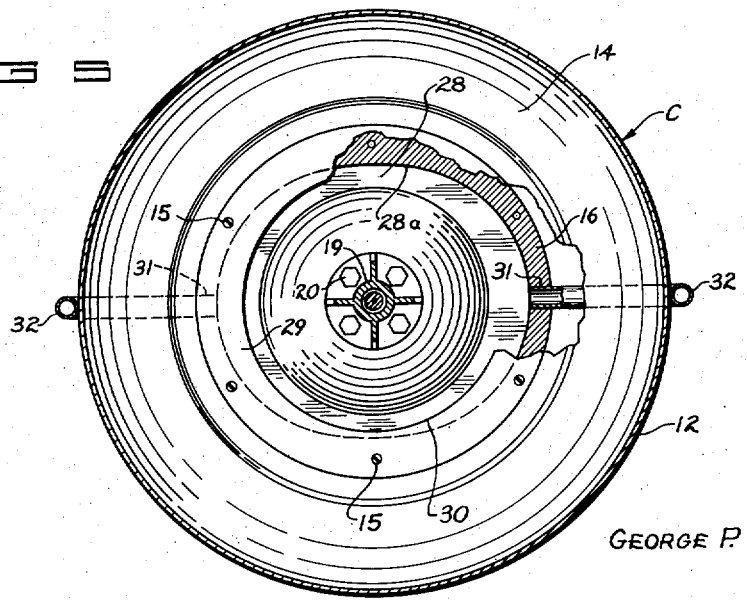
Fig. 5 is a horizontal section taken substantially along the line 5—5 in Fig. 1.

Referring to Fig. 5, it will be noted that the inner upright margin of the rim 16, which is in effect the margin 28[a] of the sediment trap 28, is oval in shape or elongated on an axis coinciding with the diametrically opposed outlets 31. The effect of this shape of the trap is to cause the material to work toward the outlets 31 so that the material will be completely expelled when the tub is spun.

Also during the washing operation there collects a scum and suds on top of the water which contains considerable dirt in suspension, and without some means to dispose of this scum it will have a tendency to settle on and sift into the clothes as the water is swirled from the tub in the drying operation. For thus purpose I provide a de-scumming means which comprises an annular, upwardly and inwardly curving member or baffle 45 which is secured in any suitable manner by its outer lower edge 46 to the inside of the tub wall 12 some distance below the opening 13. The inner, upper margin 47 of this member 45 is rolled to present a smooth edge and the member is profusely perforated as indicated at 48. The clothes and water may be readily placed in the tub without interference from the member 45 and the washing and rinsing operations may proceed likewise without any trouble on this score, it being noted that the water level in the machine will be substantially even with the upper inner edge of the member 45.

As the extraction is started, however, the curvature of the inner lower surface of the member 45 will guide the clothes downwardly as indicated by the solid line arrows in Fig. 1, while the swirling of the surface water outwardly and upwardly as indicated by the broken arrows will cause the scum and suds atop the water to be carried out through the perforations 48 and out through the channels 34 instead of settling onto the clothes. As the water is put in motion by the spinning tub the tendency of the center of the water mass to settle might cause some of the scum to work down along the bell-like skirt 26 of the agitator and thence to work into the clothes, but to prevent this I perforate this skirt as indicated at 49. The scum may then fall through the openings 49 into the sediment trap 28 for removal therefrom by the action previously described.

Figure 3:
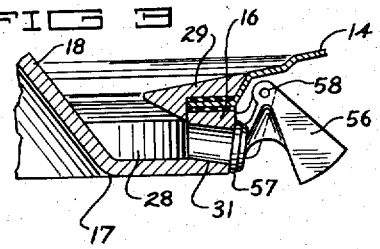
Figs. 2 and 3 are similar sectional detail views of lower portions of the washing and spinning tub, showing two modifications of sediment disposal valves in accordance with my invention.
Figure 2:
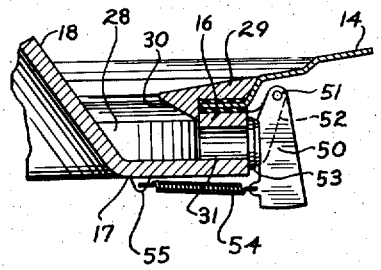

In lieu of the tubes *32* [37] for carrying off the sedimentary material, and which tubes must necessarily extend above the water level in the tub as they are here shown, I may provide spring loaded or weighted valves for closing the sediment trap outlets 31 as seen in Figs. 2 and 3. Such valves will normally close the outlets so that the water will be kept in the tub.

As shown in Fig. 2 one form of spring loaded valve for this purpose may comprise a weight 50 pivotally attached at 51 to a lug 52 upon the outer edge of the base plate 17 so that a valve disk 53 carried by or formed on the weight may close against the outer end of the adjacent outlet 31. A retractile coil spring 54 is stretched between the lower end of the weight 50 and a lug 55 beneath the plate 17 and this spring will normally urge the valve disk tightly to its seat to close the outlet as required. However, when the tub C is set to spinning the centrifugal force will cause the weight 50 to swing outward, while overcoming the tension of the spring 54, and so will open the outlet for the discharge of accumulated sediment out into the bottom of the casing B.

The valve of Fig. 3 is similar in that it comprises a similarly pivoted weight 56 and a valve disk 57. The weight 56 is, however, supported outwardly and downwardly from its pivot 58 so that it holds the disk in place to close the outlet 31 by gravity alone. The opening operation of course here also occurs automatically when the tub is spun.

Obviously the tub C need not have a separate bottom plate such as here indicated at 17 in order to form the sediment trap 28. It is only necessary to appropriately form the tub bottom itself to provide a central depression in which the sediment may collect in order to carry out my invention. Also the flutes or corrugations 35 are not necessary to the extraction of the water from the imperforate tub since the extraction may be accomplished merely by appropriately forming the tub walls themselves. The fluted formation of the tub walls does, however, work out effectively with the de-skimming member 45.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a washing machine having a tub adapted to receive liquid and material to be washed and to be spun to centrifugally extract the liquid from the material, the tub being provided with a recess in its bottom to accumulate and trap sedimentary material during the washing operation and said recess having at least one outlet in its outer wall to discharge such trapped material centrifugally as the tub is spun, and the said recess being so shaped that such outlet will be spaced further from the axis of rotation than other parts of the wall whereby the trapped sedimentary material will work from opposite sides toward said outlet by centrifugal action.

2. In a washing machine having a tub adapted to receive liquid and material to be washed and to be spun to centrifugally extract the liquid from the material, the tub being provided with a recess in its bottom to accumulate and trap sedimentary material during the washing operation and said recess having oppositely located outlets for centrifugally discharging trapped material from the recess as the tub is spun, and said recess being elongated on an axis coinciding with a line through the outlets whereby trapped material will work toward said outlets by centrifugal force and the recess will be fully emptied of material.

3. In a washing machine, a housing, a tub mounted in the housing for rotation about a substantially vertical axis, said tub having an imperforate side wall which tapers downwardly so that when rotated at high speed centrifugal action will cause the liquid content of the tub to move upwardly along the interior surface of the tub wall and be discharged over the upper end thereof into the housing, said tub being provided at its bottom end with a generally circular sediment receiving chamber, and tubular members extending outwardly from the sediment receiving chamber and thence upwardly along the outside of the tub to centrifugally discharge sedimentary material from the receiving chamber independently of the centrifugal discharge of liquid within the tub up and over the upper edge of the wall thereof.

4. In a washing machine, a rotatable tub having an imperforate upwardly flared side wall operative, when rotated at high speed, to centrifugally discharge the fluid content of the tub upwardly along said wall and thence outwardly over its upper edge, said wall having an inwardly dished bottom portion terminating in a depression forming a sediment trap, and a tube connected at its inner end to the sediment trap and extending outwardly and upwardly therefrom to discharge sedimentary material from the trap independently of the upward and outward centrifugal discharge of the main body of fluid along and over the tub wall.

5. In a washing machine, a tub for containing liquid and material to be washed and mounted for spinning to discharge the liquid centrifugally, said tub having upwardly flared side walls which will cause the centrifugal liquid to move upwardly therealong for discharge from the upper end of the tub, said side walls curving inwardly at their lower ends and terminating in an annular recess adapted to receive liquid and sedimentary material during the washing operation, a circular flange extending inwardly over the outer part of the recess to produce a horizontal separation of liquid during the spinning of the tub whereby the main body of liquid adjacent thereto will be deflected upwardly and whereby the liquid and sediment below the inner edge of the flange will be restricted to the space in the recess below the level of the flange, means for preventing materials being washed from entering the recess with the sediment, and means for centrifugally discharging the contents of the recess independently of the main upward discharge of liquid from the tub.

*6. In a washing machine, a rotatable tub having an imperforate upwardly flared side wall operative, when rotated at high speed, to centrifugally discharge the fluid content of the tub upwardly along said wall and thence outwardly over its upper edge, said wall having an inwardly dished bottom portion terminating in a generally circular depression forming a substantially annular sediment trap, and a tube connected at its inner end to the sediment trap and extending outwardly and upwardly therefrom to discharge sedimentary material from the trap independently of the upward and outward centrifugal discharge of the main body of fluid along and over the tub wall.*

*7. In a washing machine, a rotatable tub having an imperforate upwardly flared side wall operative, when rotated at high speed, to centrifugally discharge the fluid content of the tub upwardly along said wall and thence outwardly over its upper edge, said wall having an inwardly dished bottom portion terminating in a substantially circular depression forming a sediment trap concentrically within and below said dished bottom portion, and a tube connected at its inner end to the sediment trap and extending outwardly and upwardly therefrom to discharge sedimentary material from the trap independently of the upward and outward centrifugal discharge of the main body of fluid along and over the tub wall.*

*8. In a washing machine, a rotatable tub having an imperforate upwardly flared side wall operative, when rotated at high speed, to centrifugally discharge the fluid content of the tub upwardly along said wall and thence outwardly over its upper edge, said wall having an inwardly dished bottom portion terminating in a depression forming a sediment trap, said depression extending annularly about the axis of the tub and being disposed within and below the dished bottom portion thereof whereby sediment may drain radially inwardly from all parts of the bottom portion and into the sediment trap, and a tube connected at its inner end to the sediment trap and extending outwardly and upwardly therefrom to discharge sedimentary material from the trap independently of the upward and outward centrifugal discharge of the main body of fluid along and over the tub wall.*

GEORGE P. CASTNER.

REFERENCES CITED

The following references are of record in the file of this patent or the original patent:

UNITED STATES PATENTS

| Number | Name | Date |
|---|---|---|
| 1,475,323 | Schmucking | Nov. 27, 1923 |
| 1,773,334 | Altorfer | Aug. 19, 1930 |
| 2,106,986 | Pearce | Feb. 1, 1938 |
| 2,264,202 | Forney | Nov. 25, 1941 |
| 2,279,878 | Suits et al. | Apr. 14, 1942 |
| 2,331,700 | Kirby | Oct. 12, 1943 |
| 2,339,345 | McCleary | Jan. 18, 1944 |
| 2,375,635 | Dyer | May 8, 1945 |
| 2,378,392 | Candor | June 19, 1945 |
| 2,392,652 | Dyer | Jan. 8, 1946 |